United States Patent
Cho et al.

(10) Patent No.: US 11,362,773 B2
(45) Date of Patent: Jun. 14, 2022

(54) METHOD AND APPARATUS FOR TRANSMITTING AND RECEIVING DATA BY RELAY NODE IN WIRELESS COMMUNICATION SYSTEM

(71) Applicant: LG ELECTRONICS INC., Seoul (KR)

(72) Inventors: Heejeong Cho, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/055,981

(22) PCT Filed: Jul. 26, 2019

(86) PCT No.: PCT/KR2019/009336
§ 371 (c)(1),
(2) Date: Nov. 16, 2020

(87) PCT Pub. No.: WO2020/027505
PCT Pub. Date: Feb. 6, 2020

(65) Prior Publication Data
US 2021/0258109 A1    Aug. 19, 2021

(30) Foreign Application Priority Data
Jul. 31, 2018    (KR) .......... 10-2018-0089563

(51) Int. Cl.
*H04L 1/18*    (2006.01)
*H04L 1/16*    (2006.01)
*H04W 88/14*   (2009.01)

(52) U.S. Cl.
CPC .......... *H04L 1/1896* (2013.01); *H04L 1/1642* (2013.01); *H04W 88/14* (2013.01)

(58) Field of Classification Search
CPC .... H04L 1/1896; H04L 1/1642; H04W 88/14; H04W 74/06; H04W 28/065
See application file for complete search history.

(56) References Cited

U.S. PATENT DOCUMENTS

| 2012/0163304 | A1* | 6/2012 | Chun | H04L 1/1838 370/328 |
| 2013/0226400 | A1  | 8/2013 | King et al. | |
| 2019/0200322 | A1* | 6/2019 | Wang | H04W 68/02 |

OTHER PUBLICATIONS

PCT International Application No. PCT/KR2019/009336, International Search Report dated Oct. 29, 2019, 10 pages.
AT&T, "End-to-end vs. hop-by-hop RLC ARQ design for L2 relaying in IAB," 3GPP TSG-RAN WG2 #102, R2-1808041, May 2018, 10 pages.

(Continued)

*Primary Examiner* — Jamal Javaid
(74) *Attorney, Agent, or Firm* — Lee Hong Degerman Kang Waimey

(57) ABSTRACT

The present invention relates to a wireless communication system. More specifically, the present invention relates to a method and a device for transmitting to a child node, a STATUS PDU including Negative Acknowledgement (NACK) information corresponding to one or more data units of which reception failure is detected, wherein the STATUS PDU does not include ACK information for data units which are successfully received.

8 Claims, 14 Drawing Sheets

(56) References Cited

OTHER PUBLICATIONS

3rd Generation Partnership Project, "Technical Specification Group Radio Access Network; NR; Radio Link Control (RLC) protocol specification (Release 15)," 3GPP TS 38.322 V15.2.0, Jun. 2018, 35 pages.

Huawei et al., "Adaptation layer design," 3GPP TSG-RAN WG2 Ad Hoc, R2-1810675, Jul. 2018, 7 pages.

\* cited by examiner

FIG. 4
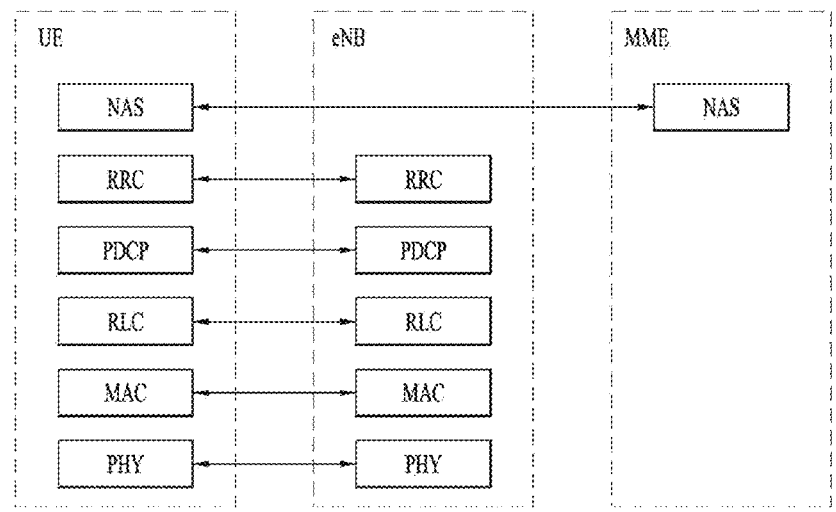
(a) Control-Plane Protocol Stack
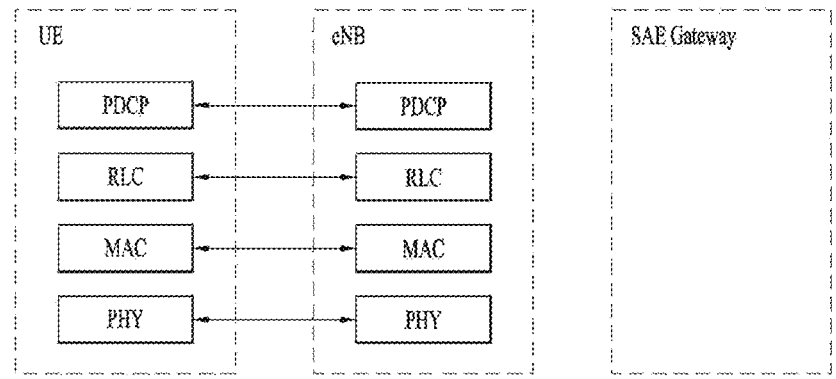
(b) User-Plane Protocol Stack FIG. 6
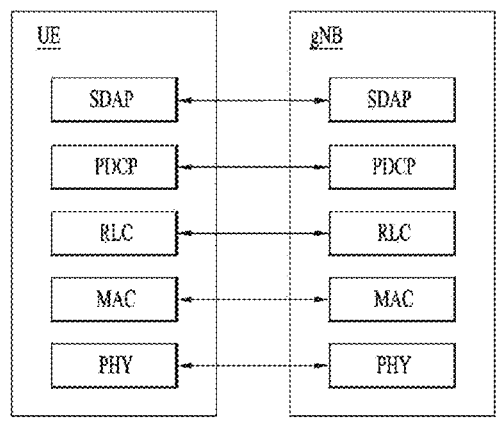
(a)
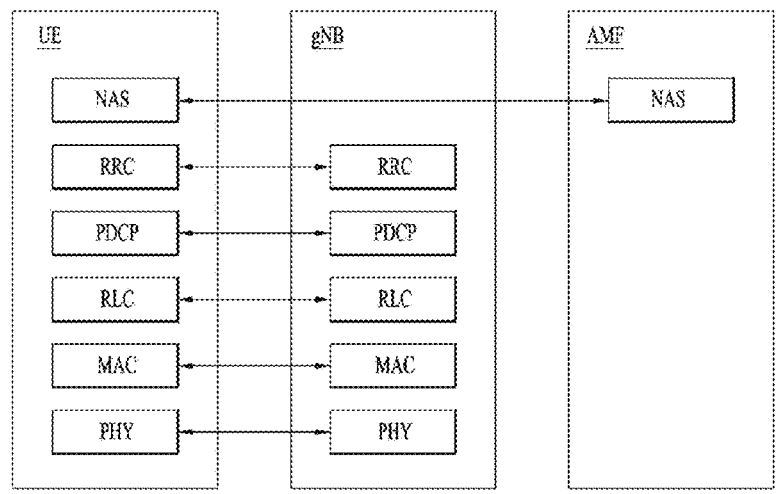
(b)

FIG. 10

| D/C | CPT | | ACK_SN | | | | | Oct 1 |
|---|---|---|---|---|---|---|---|---|
| ACK_SN | | | | | | | | Oct 2 |
| E1 | R | R | R | R | R | R | R | Oct 3 |
| NACK_SN | | | | | | | | Oct 4 |
| NACK_SN | | | E1 | E2 | E3 | R | | Oct 5 |
| NACK_SN | | | | | | | | Oct 6 |
| NACK_SN | | | E1 | E2 | E3 | R | | Oct 7 |
| SO start | | | | | | | | Oct 8 |
| SO start | | | | | | | | Oct 9 |
| SO end | | | | | | | | Oct 10 |
| SO end | | | | | | | | Oct 11 |
| NACK range | | | | | | | | Oct 12 |
| NACK_SN | | | | | | | | Oct 13 |
| NACK_SN | | | E1 | E2 | E3 | R | | Oct 14 |
| ... | | | | | | | | |

(a) STATUS PDU with 12 bit SN

| D/C | CPT | | ACK_SN | | | | | Oct 1 |
|---|---|---|---|---|---|---|---|---|
| ACK_SN | | | | | | | | Oct 2 |
| ACK_SN | | | | | | E1 | R | Oct 3 |
| NACK_SN | | | | | | | | Oct 4 |
| NACK_SN | | | | | | | | Oct 5 |
| NACK_SN | E1 | E2 | E3 | R | R | R | | Oct 6 |
| NACK_SN | | | | | | | | Oct 7 |
| NACK_SN | | | | | | | | Oct 8 |
| NACK_SN | E1 | E2 | E3 | R | R | R | | Oct 9 |
| SO start | | | | | | | | Oct 10 |
| SO start | | | | | | | | Oct 11 |
| SO end | | | | | | | | Oct 12 |
| SO end | | | | | | | | Oct 13 |
| NACK range | | | | | | | | Oct 14 |
| NACK_SN | | | | | | | | Oct 15 |
| NACK_SN | | | | | | | | Oct 16 |
| NACK_SN | E1 | E2 | E3 | R | R | R | | Oct 17 |
| ... | | | | | | | | Oct 18 |

(b) STATUS PDU with 18 bit SN

FIG. 11
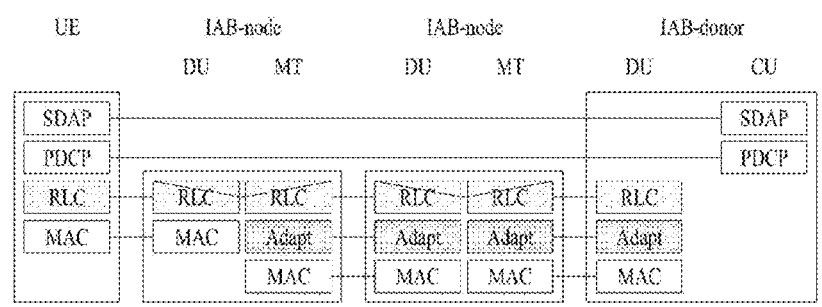
(a)
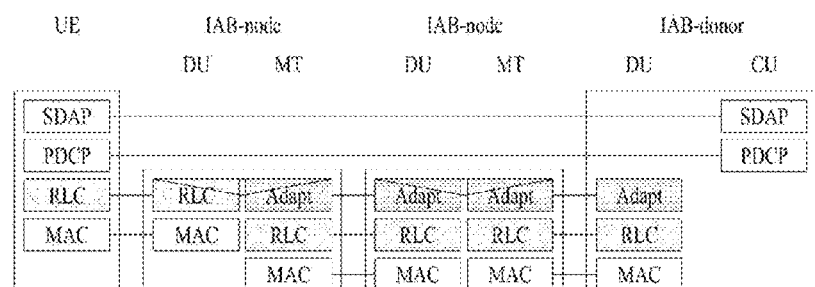
(b)

FIG. 13

| D/C | CPT=001 | E1 | R | R | R | Oct 1 |
|---|---|---|---|---|---|---|
| NACK_SN | | | | | | Oct 2 |
| NACK_SN | | E1 | E2 | E3 | R | Oct 3 |

METHOD AND APPARATUS FOR TRANSMITTING AND RECEIVING DATA BY RELAY NODE IN WIRELESS COMMUNICATION SYSTEM

TECHNICAL FIELD

The present invention relates to a wireless communication system and, more particularly, to a method for transmitting and receiving data by a relay node in a wireless communication system and an apparatus therefor.

BACKGROUND ART

Introduction of new radio communication technologies has led to increases in the number of user equipments (UEs) to which a base station (BS) provides services in a prescribed resource region, and has also led to increases in the amount of data and control information that the BS transmits to the UEs. Due to typically limited resources available to the BS for communication with the UE(s), new techniques are needed by which the BS utilizes the limited radio resources to efficiently receive/transmit uplink/downlink data and/or uplink/downlink control information. In particular, overcoming delay or latency has become an important challenge in applications whose performance critically depends on delay/latency.

DISCLOSURE

Technical Problem

Accordingly, an object of the present invention is to transmit and receive data by a relay node in a wireless communication system and apparatus therefore.

The technical problems solved by the present invention are not limited to the above technical problems and those skilled in the art may understand other technical problems from the following description.

Technical Solution

As an aspect of the present invention, A method for transmitting and receiving data by an Integrated Access and Backhaul (IAB) node in a wireless communication system, the method comprising: receiving, from a child node, data units; generating a STATUS Protocol Data Unit (PDU) when a reception failure of one or more data units is detected; transmitting, to the child node, the STATUS PDU including Negative Acknowledgement (NACK) information corresponding to the one or more data units of which the reception failure is detected, wherein the STATUS PDU does not include ACK information for the data units which are successfully received.

As another aspect of the present invention, an Integrated Access and Backhaul (IAB) node for transmitting and receiving data in a wireless communication system, the IAB node comprising: a memory; and at least one processor coupled to the memory and configured to: receive, from a child node, data units; generate a STATUS Protocol Data Unit (PDU) when a reception failure of one or more data units is detected; transmit, to the child node, the STATUS PDU including Negative Acknowledgement (NACK) information corresponding to the one or more data units of which the reception failure is detected, wherein the STATUS PDU does not include ACK information for the data units which are successfully received.

Preferably, there can be one or more parent nodes for the IAB node and the parent node is one of the other IAB nodes or an IAB donor.

Preferably, The child node is a UE (User Equipment) or one of the other IAB nodes excluding the parent node(s).

Preferably, the STATUS PDU includes a field for that an acknowledgement state variable of the child node is not to be updated.

Preferably, the acknowledgement state variable of the child node is not updated even when a smallest Sequence Number (SN) among SNs related to the NACK information is different from the acknowledgement state variable.

Preferably, the IAB node receives the one or more data units retransmitted from the child node.

Preferably, the STATUS PDU includes a Control PDU Type (CPT) field set to a specific value indicating that the STATUS PDU does not include the ACK information for the data units which are successfully received, or the STATUS PDU includes an ACK SN field set to a specific value indicating that the STATUS PDU does not include the ACK information for the data units which are successfully received, or the STATUS PDU includes the ACK SN field set to a value which is equal to or less than a smallest SN among SNs of the one or more data units of which the reception failure is detected, or the STATUS PDU includes the ACK SN field set to a value which is equal to or less than a biggest SN among the SNs of the one or more data units of which the reception failure is detected.

Preferably, the at least one processor is further configured to implement at least one advanced driver assistance system (ADAS) function based on signals that control a User Equipment.

Advantageous Effects

According to the aforementioned embodiments of the present invention, the UE can transmit a plurality of data units efficiently.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 4 is a diagram showing an example of a control plane and a user plane of a radio interface protocol between a UE and an E-UTRAN based on a 3GPP radio access network standard;

FIG. 6 illustrates an example of protocol stacks of a next generation wireless communication system;

FIG. 10 shows structures of the STATUS PDUs.

FIG. 11 shows an example of IAB based RAN architectures.

FIG. 13 shows structure of the NACK STATUS PDU.

MODE FOR INVENTION

The technical objects that can be achieved through the present disclosure are not limited to what has been particularly described hereinabove and other technical objects not described herein will be more clearly understood by persons skilled in the art from the following detailed description.

Figure 1:
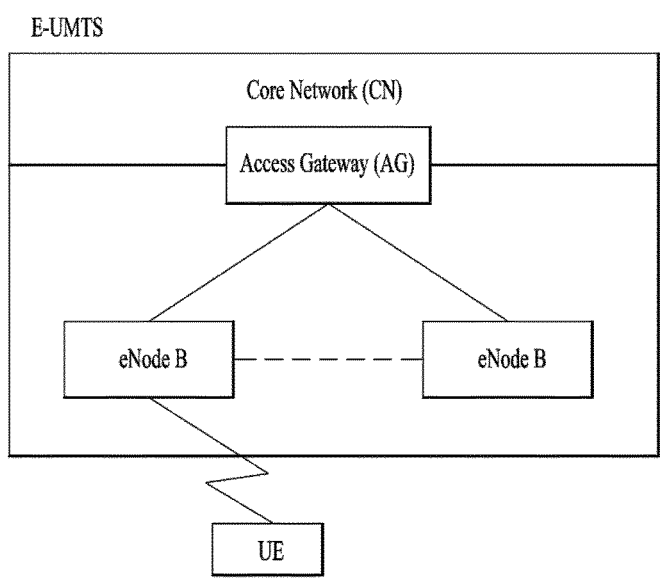
FIG. 1 is a diagram illustrating an example of a network structure of an evolved universal mobile telecommunication system (E-UMTS) as an exemplary radio communication system.

FIG. 1 is a diagram illustrating an example of a network structure of an E-UMTS as an exemplary radio communication system. An Evolved Universal Mobile Telecommunications System (E-UMTS) is an advanced version of a Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information about DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information about UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

Reference will now be made in detail to the exemplary implementations of the present disclosure, examples of which are illustrated in the accompanying drawings. The detailed description, which will be given below with reference to the accompanying drawings, is intended to explain exemplary implementations of the present disclosure, rather than to show the only implementations that can be implemented according to the disclosure. The following detailed description includes specific details in order to provide a thorough understanding of the present disclosure. However, it will be apparent to those skilled in the art that the present disclosure may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, implementations of the present disclosure are described in regards to a 3GPP based wireless communication system. However, the technical features of the present disclosure are not limited thereto. For example, although the following detailed description is given based on a mobile communication system corresponding to a 3GPP based system, aspects of the present disclosure that are not limited to 3GPP based system are applicable to other mobile communication systems.

For example, the present disclosure is applicable to contention based communication such as Wi-Fi as well as non-contention based communication as in the 3GPP based system in which a BS allocates a DL/UL time/frequency resource to a UE and the UE receives a DL signal and transmits a UL signal according to resource allocation of the BS. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present disclosure, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the EPC/LTE is referred to as an eNB, and a BS of the new radio (NR) system is referred to as a gNB.

In the present disclosure, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may include a physical antenna or an antenna port or a virtual antenna.

In the present disclosure, a cell refers to a prescribed geographical area to which one or more nodes provide a communication service. Accordingly, in the present disclosure, communicating with a specific cell may include communicating with a BS or a node which provides a communication service to the specific cell. In addition, a DL/UL signal of a specific cell refers to a DL/UL signal from/to a BS or a node which provides a communication service to the specific cell. A node providing UL/DL communication services to a UE is called a serving node and a cell to which UL/DL communication services are provided by the serving node is especially called a serving cell.

In some scenarios, a 3GPP based system implements a cell to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

In some scenarios, the recent 3GPP based wireless communication standard implements a cell to manage radio resources. The "cell" associated with the radio resources utilizes a combination of downlink resources and uplink resources, for example, a combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency may be a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell refers to a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

In the present disclosure, "PDCCH" refers to a PDCCH, an EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present disclosure, monitoring a channel refers to attempting to decode the channel. For example, monitoring a PDCCH refers to attempting to decode PDCCH(s) (or PDCCH candidates).

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331, and 3GPP NR standard documents, for example, 3GPP TS 38.211, 3GPP TS 38.213, 3GPP TS 38.214, 3GPP TS 38.300, 3GPP TS 38.321, 3GPP TS 38.322, 3GPP TS 38.323 and 3GPP TS 38.331 may be referenced.

Figure 2:
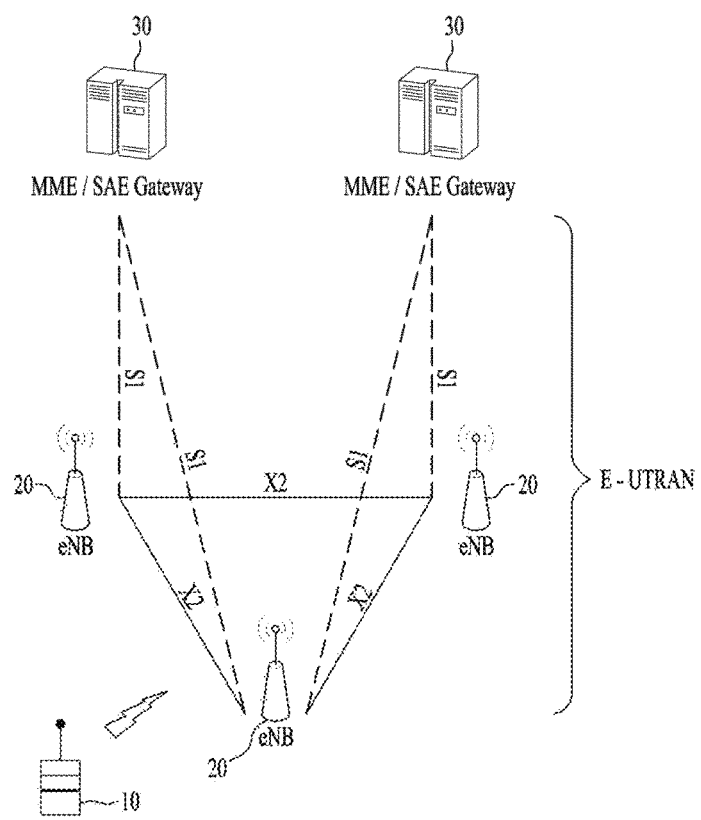
FIG. 2 is a block diagram illustrating an example of an evolved universal terrestrial radio access network (E-UTRAN)

FIG. 2 is a block diagram illustrating an example of an evolved universal terrestrial radio access network (E-UTRAN). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipments (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from BS 20 to UE 10, and "uplink" refers to communication from the UE to a BS.

Figure 3:
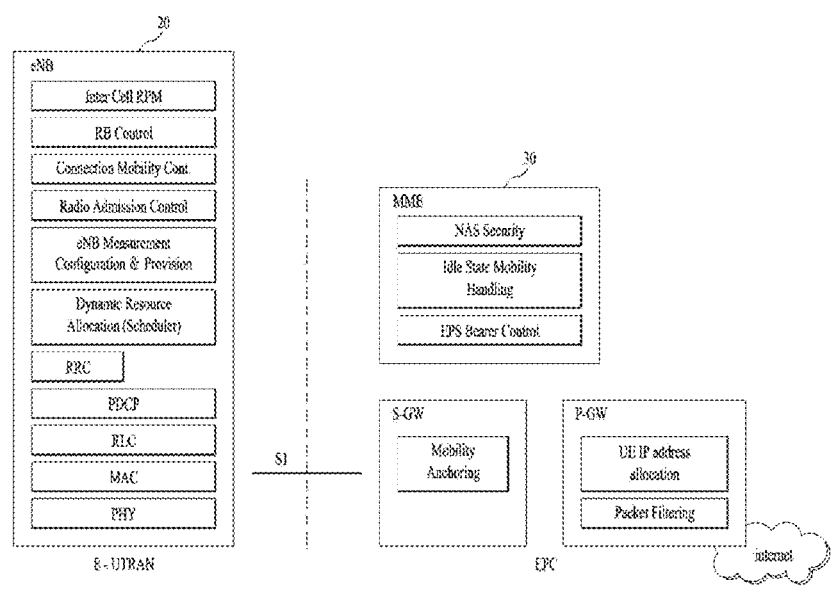
FIG. 3 is a block diagram depicting an example of an architecture of a typical E-UTRAN and a typical EPC.

FIG. 3 is a block diagram depicting an example of an architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an Si interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, access stratum (AS) Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the Si interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 4 is a diagram showing an example of a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the 3GPP LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the 3GPP LTE/LTE-A system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

The main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ; priority handling between logical channels of one UE; priority handling between UEs by dynamic scheduling; MBMS service identification; transport format selection; and padding.

The main services and functions of the RLC sublayer include: transfer of upper layer protocol data units (PDUs); error correction through ARQ (only for acknowledged mode (AM) data transfer); concatenation, segmentation and reassembly of RLC service data units (SDUs) (only for unacknowledged mode (UM) and acknowledged mode (AM) data transfer); re-segmentation of RLC data PDUs (only for AM data transfer); reordering of RLC data PDUs (only for UM and AM data transfer); duplicate detection (only for UM and AM data transfer); protocol error detection (only for AM data transfer); RLC SDU discard (only for UM and AM data transfer); and RLC re-establishment, except for a NB-IoT UE that only uses Control Plane CIoT EPS optimizations.

The main services and functions of the PDCP sublayer for the user plane include: header compression and decompression (ROHC only); transfer of user data; in-sequence delivery of upper layer PDUs at PDCP re-establishment procedure for RLC AM; for split bearers in DC and LWA bearers (only support for RLC AM), PDCP PDU routing for transmission and PDCP PDU reordering for reception; duplicate detection of lower layer SDUs at PDCP re-establishment procedure for RLC AM; retransmission of PDCP SDUs at handover and, for split bearers in DC and LWA bearers, of PDCP PDUs at PDCP data-recovery procedure, for RLC AM; ciphering and deciphering; timer-based SDU discard in uplink. The main services and functions of the PDCP for the control plane include: ciphering and integrity protection; and transfer of control plane data. For split and LWA bearers, PDCP supports routing and reordering. For DRBs mapped on RLC AM and for LWA bearers, the PDCP entity uses the reordering function when the PDCP entity is associated with two AM RLC entities, when the PDCP entity is configured for a LWA bearer; or when the PDCP entity is associated with one AM RLC entity after it was, according to the most recent reconfiguration, associated with two AM RLC entities or configured for a LWA bearer without performing PDCP re-establishment.

Layer 3 (i.e. L3) of the LTE/LTE-A system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

Radio bearers are roughly classified into (user) data radio bearers (DRBs) and signaling radio bearers (SRBs). SRBs are defined as radio bearers (RBs) that are used only for the transmission of RRC and NAS messages.

In LTE, one cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
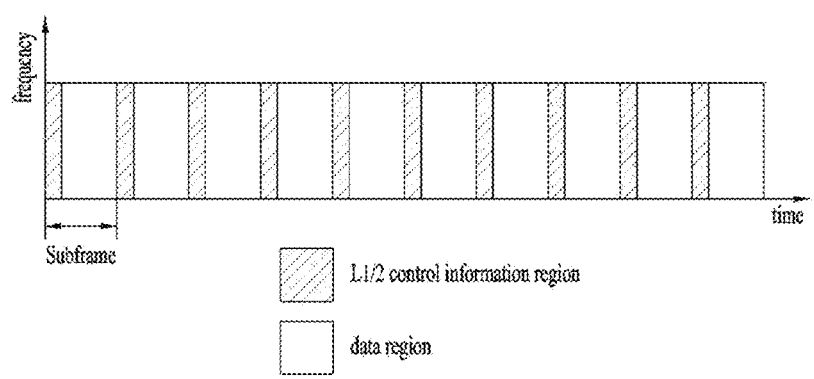
FIG. 5 is a diagram showing an example of a physical channel structure used in an E-UMTS system.

FIG. 5 is a diagram showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. The PDCCH carries scheduling assignments and other control information. In FIG. 5, an L1/L2 control information transmission area (PDCCH) and a data area (PDSCH) are shown. In one implementation, a radio frame of 10 ms is used and one radio frame includes 10 subframes. In addition, in LTE, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the 3GPP LTE/LTE-A system, an opportunity of transmission of an UL grant or a DL grant is present every 1 ms, and the UL/DL grant opportunity does not exists several times in less than 1 ms. Therefore, the TTI in the legacy 3GPP LTE/LTE-A system is 1 ms.

A base station and a UE mostly transmit/receive data via a PDSCH, which is a physical channel, using a downlink shared channel (DL-SCH) which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one implementation, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receives the PDSCH indicated by B and C in the PDCCH information. In the present disclosure, a PDCCH addressed to an RNTI refers to the PDCCH being cyclic redundancy check masked (CRC-masked) with the RNTI. A UE may attempt to decode a PDCCH using the certain RNTI if the UE is monitoring a PDCCH addressed to the certain RNTI.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency, and cost efficiency. To meet the above ever-increasing requirements from market and mobile communication society, next generation access technologies are expected to emerge in the near future.

Building upon its success of IMT-2000 (3G) and IMT-Advanced (4G), 3GPP has been devoting its effort to IMT-2020 (5G) development since September 2015. 5G New Radio (NR) is expected to expand and support diverse use case scenarios and applications that will continue beyond the current IMT-Advanced standard, for instance, enhanced Mobile Broadband (eMBB), Ultra Reliable Low Latency Communication (URLLC) and massive Machine Type Communication (mMTC). eMBB is targeting high data rate mobile broadband services, such as seamless data access both indoors and outdoors, and AR/VR applications; URLLC is defined for applications that have stringent latency and reliability requirements, such as vehicular communications that can enable autonomous driving and control network in industrial plants; mMTC is the basis for connectivity in IoT, which allows for infrastructure management, environmental monitoring, and healthcare applications.

FIG. 6 illustrates an example of protocol stacks of a next generation wireless communication system. In particular, FIG. 6(a) illustrates an example of a radio interface user plane protocol stack between a UE and a gNB and FIG. 6(b) illustrates an example of a radio interface control plane protocol stack between a UE and a gNB.

The control plane refers to a path through which control messages used to manage call by a UE and a network are transported. The user plane refers to a path through which data generated in an application layer, for example, voice data or Internet packet data are transported.

Referring to FIG. 6(a), the user plane protocol stack may be divided into a first layer (Layer 1) (i.e., a physical layer (PHY) layer) and a second layer (Layer 2).

Referring to FIG. 6(b), the control plane protocol stack may be divided into Layer 1 (i.e., a PHY layer), Layer 2, Layer 3 (e.g., a radio resource control (RRC) layer), and a non-access stratum (NAS) layer.

The overall protocol stack architecture for the NR system might be similar to that of the LTE/LTE-A system, but some functionalities of the protocol stacks of the LTE/LTE-A system should be modified in the NR system in order to resolve the weakness or drawback of LTE. RAN WG2 for NR is in charge of the radio interface architecture and protocols. The new functionalities of the control plane include the following: on-demand system information delivery to reduce energy consumption and mitigate interference, two-level (i.e. Radio Resource Control (RRC) and Medium Access Control (MAC)) mobility to implement seamless handover, beam based mobility management to accommodate high frequency, RRC inactive state to reduce state transition latency and improve UE battery life. The new functionalities of the user plane aim at latency reduction by optimizing existing functionalities, such as concatenation and reordering relocation, and RLC out of order delivery. In addition, a new user plane AS protocol layer named as Service Data Adaptation Protocol (SDAP) has been introduced to handle flow-based Quality of Service (QoS) framework in RAN, such as mapping between QoS flow and a data radio bearer, and QoS flow ID marking. Hereinafter the layer 2 according to the current agreements for NR is briefly discussed.

The layer 2 of NR is split into the following sublayers: Medium Access Control (MAC), Radio Link Control (RLC), Packet Data Convergence Protocol (PDCP) and Service Data Adaptation Protocol (SDAP). The physical layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers, and the SDAP sublayer offers to 5GC QoS flows. Radio bearers are categorized into two groups: data radio bearers (DRB) for user plane data and signaling radio bearers (SRB) for control plane data.

The main services and functions of the MAC sublayer of NR include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per carrier in case of carrier aggregation); priority handling between UEs by dynamic scheduling; priority handling between logical channels of one UE by logical channel prioritization; and padding. A single MAC entity can support one or multiple numerologies and/or transmission timings, and mapping restrictions in logical channel prioritization controls which numerology and/or transmission timing a logical channel can use.

The RLC sublayer of NR supports three transmission modes: Transparent Mode (TM); Unacknowledged Mode (UM); Acknowledged Mode (AM). The RLC configuration is per logical channel with no dependency on numerologies and/or TTI durations, and ARQ can operate on any of the numerologies and/or TTI durations the logical channel is configured with. For SRB0, paging and broadcast system information, TM mode is used. For other SRBs AM mode used. For DRBs, either UM or AM mode are used. The main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; Reassembly of SDU (AM and UM); duplicate detection (AM only); RLC SDU discard (AM and UM); RLC re-establishment; and protocol error detection (AM only). The ARQ within the RLC sublayer of NR has the following characteristics: ARQ retransmits RLC PDUs or RLC PDU segments based on RLC status reports; polling for RLC status report is used when needed by RLC; and RLC receiver can also trigger RLC status report after detecting a missing RLC PDU or RLC PDU segment.

The main services and functions of the PDCP sublayer of NR for the user plane include: sequence numbering; header compression and decompression (ROHC only); transfer of user data; reordering and duplicate detection; PDCP PDU routing (in case of split bearers); retransmission of PDCP SDUs; ciphering, deciphering and integrity protection; PDCP SDU discard; PDCP re-establishment and data recovery for RLC AM; and duplication of PDCP PDUs. The main services and functions of the PDCP sublayer of NR for the control plane include: sequence numbering; ciphering, deciphering and integrity protection; transfer of control plane data; reordering and duplicate detection; and duplication of PDCP PDUs.

The main services and functions of SDAP include: mapping between a QoS flow and a data radio bearer; marking QoS flow ID (QFI) in both DL and UL packets. A single protocol entity of SDAP is configured for each individual PDU session. Compared to LTE's QoS framework, which is bearer-based, the 5G system adopts the QoS flow-based framework. The QoS flow-based framework enables flexible mapping of QoS flow to DRB by decoupling QoS flow and the radio bearer, allowing more flexible QoS characteristic configuration.

The main services and functions of RRC sublayer of NR include: broadcast of system information related to access stratum (AS) and non-access stratum (NAS); paging initiated by a 5GC or an NG-RAN; establishment, maintenance, and release of RRC connection between a UE and a NG-RAN (which further includes modification and release of carrier aggregation and further includes modification and release of the DC between an E-UTRAN and an NR or in the NR; a security function including key management; establishment, configuration, maintenance, and release of SRB(s) and DRB(s); handover and context transfer; UE cell selection and re-release and control of cell selection/re-selection; a mobility function including mobility between RATs; a QoS management function, UE measurement report, and report control; detection of radio link failure and discovery from radio link failure; and NAS message transfer to a UE from a NAS and NAS message transfer to the NAS from the UE.

Hereinafter, 5G communication system is briefly introduced.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g. e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Figure 7:
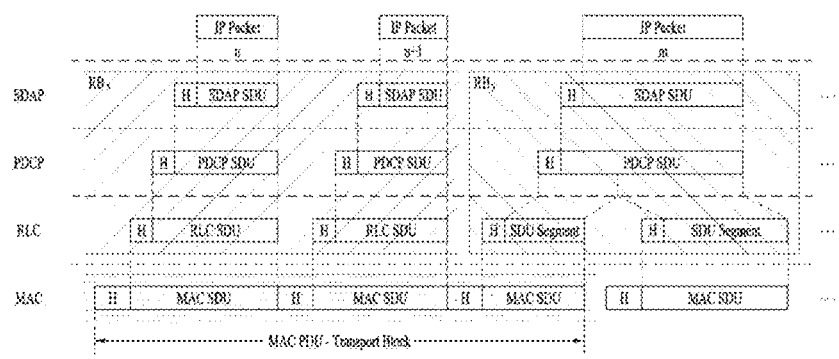
FIG. 7 illustrates an example of a data flow example at a transmitting device in the NR system.

FIG. 7 illustrates a data flow example at a transmitting device in the NR system.

In FIG. 7, an RB denotes a radio bearer. Referring to FIG. 7, a transport block is generated by MAC by concatenating two RLC PDUs from RBx and one RLC PDU from RBy. In FIG. 7, the two RLC PDUs from RBx each corresponds to one IP packet (n and n+1) while the RLC PDU from RBy is a segment of an IP packet (m). In NR, a RLC SDU segment can be located in the beginning part of a MAC PDU and/or in the ending part of the MAC PDU. The MAC PDU is transmitted/received using radio resources through a physical layer to/from an external device.

Figure 8:
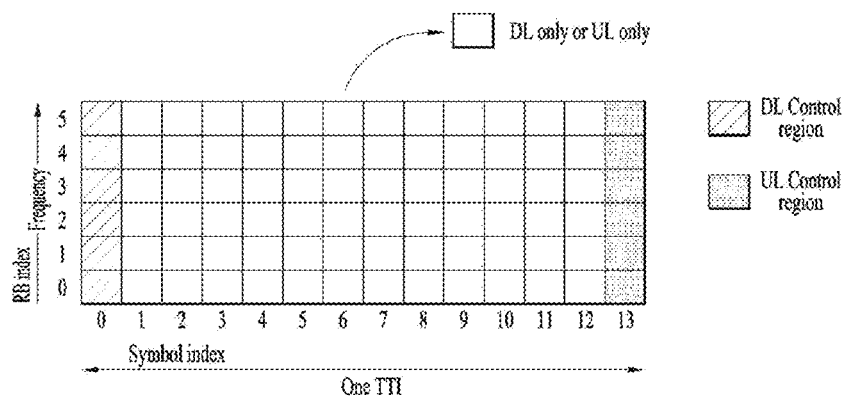
FIG. 8 illustrates an example of a slot structure available in a new radio access technology (NR)

FIG. 8 illustrates an example of a slot structure available in a new radio access technology (NR).

To reduce or minimize data transmission latency, in a 5G new RAT, a slot structure in which a control channel and a data channel are time-division-multiplexed is considered.

In the example of FIG. 8, the hatched area represents the transmission region of a DL control channel (e.g., PDCCH) carrying the DCI, and the black area represents the transmission region of a UL control channel (e.g., PUCCH) carrying the UCI. Here, the DCI is control information that the gNB transmits to the UE. The DCI may include information on cell configuration that the UE should know, DL specific information such as DL scheduling, and UL specific information such as UL grant. The UCI is control information that the UE transmits to the gNB. The UCI may include a HARQ ACK/NACK report on the DL data, a CSI report on the DL channel status, and a scheduling request (SR).

In the example of FIG. 8, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the slot structure of FIG. 8, DL transmission and UL transmission may be sequentially performed in one slot, and thus transmission/reception of DL data and reception/transmission of UL ACK/NACK for the DL data may be performed in one slot. As a result, the time taken to retransmit data when a data transmission error occurs may be reduced, thereby minimizing the latency of final data transmission.

In such a slot structure, a time gap is needed for the process of switching from the transmission mode to the reception mode or from the reception mode to the transmission mode of the gNB and UE. On behalf of the process of switching between the transmission mode and the reception mode, some OFDM symbols at the time of switching from DL to UL in the slot structure are set as a guard period (GP).

In the legacy LTE/LTE-A system, a DL control channel is time-division-multiplexed with a data channel and a PDCCH, which is a control channel, is transmitted throughout an entire system band. However, in the new RAT, it is expected that a bandwidth of one system reaches approximately a minimum of 100 MHz and it is difficult to distribute the control channel throughout the entire band for transmission of the control channel. For data transmission/reception of a UE, if the entire band is monitored to receive the DL control channel, this may cause increase in battery consumption of the UE and deterioration in efficiency. Accordingly, in the present disclosure, the DL control channel may be locally transmitted or distributively transmitted in a partial frequency band in a system band, i.e., a channel band.

In the NR system, the basic transmission unit is a slot. A duration of the slot includes 14 symbols having a normal cyclic prefix (CP) or 12 symbols having an extended CP. In addition, the slot is scaled in time as a function of a used subcarrier spacing.

Hereinafter, RLC entities are explained.

RRC is generally in control of the RLC configuration. Functions of the RLC sub layer are performed by RLC entities. For an RLC entity configured at the gNB, there is a peer RLC entity configured at the UE and vice versa. An RLC entity receives/delivers RLC SDUs from/to upper layer and sends/receives RLC PDUs to/from its peer RLC entity via lower layers.

An RLC PDU can either be an RLC data PDU or an RLC control PDU. If an RLC entity receives RLC SDUs from upper layer, it receives them through a single RLC channel between RLC and upper layer, and after forming RLC data PDUs from the received RLC SDUs, the RLC entity submits the RLC data PDUs to lower layer through a single logical channel. If an RLC entity receives RLC data PDUs from lower layer, it receives them through a single logical channel, and after forming RLC SDUs from the received RLC data PDUs, the RLC entity delivers the RLC SDUs to upper layer through a single RLC channel between RLC and upper layer. If an RLC entity submits/receives RLC control PDUs to/from lower layer, it submits/receives them through the same logical channel it submits/receives the RLC data PDUs through.

An RLC entity can be configured to perform data transfer in one of the following three modes: Transparent Mode (TM), Unacknowledged Mode (UM) or Acknowledged Mode (AM). Consequently, an RLC entity is categorized as a TM RLC entity, an UM RLC entity or an AM RLC entity depending on the mode of data transfer that the RLC entity is configured to provide.

A TM RLC entity is configured either as a transmitting TM RLC entity or a receiving TM RLC entity. The transmitting TM RLC entity receives RLC SDUs from upper layer and sends RLC PDUs to its peer receiving TM RLC entity via lower layers. The receiving TM RLC entity delivers RLC SDUs to upper layer and receives RLC PDUs from its peer transmitting TM RLC entity via lower layers.

An UM RLC entity is configured either as a transmitting UM RLC entity or a receiving UM RLC entity. The transmitting UM RLC entity receives RLC SDUs from upper layer and sends RLC PDUs to its peer receiving UM RLC entity via lower layers. The receiving UM RLC entity delivers RLC SDUs to upper layer and receives RLC PDUs from its peer transmitting UM RLC entity via lower layers.

An AM RLC entity consists of a transmitting side and a receiving side. The transmitting side of an AM RLC entity receives RLC SDUs from upper layer and sends RLC PDUs to its peer AM RLC entity via lower layers. The receiving side of an AM RLC entity delivers RLC SDUs to upper layer and receives RLC PDUs from its peer AM RLC entity via lower layers.

Especially, the TM RLC entity can be configured to submit/receive RLC PDUs through BCCH, DL/UL CCCH, and PCCH. The TM RLC entity submits/receives TMD PDU. When a transmitting TM RLC entity forms TMD PDUs from RLC SDUs, it shall not segment the RLC SDUs and not include any RLC headers in the TMD PDUs. When a receiving TM RLC entity receives TMD PDUs, it shall deliver the TMD PDUs (which are just RLC SDUs) to upper layer.

While, the UM RLC entity can be configured to submit/receive RLC PDUs through DL/UL DTCH. The UM RLC entity submits/receives the UMD PDU, which contains either one complete RLC SDU or one RLC SDU segment. The transmitting UM RLC entity generates UMD PDU(s) for each RLC SDU. It shall include relevant RLC headers in the UMD PDU. When notified of a transmission opportunity by the lower layer, the transmitting UM RLC entity shall segment the RLC SDUs, if needed, so that the corresponding UMD PDUs, with RLC headers updated as needed, fit within the total size of RLC PDU(s) indicated by lower layer.

Figure 9:
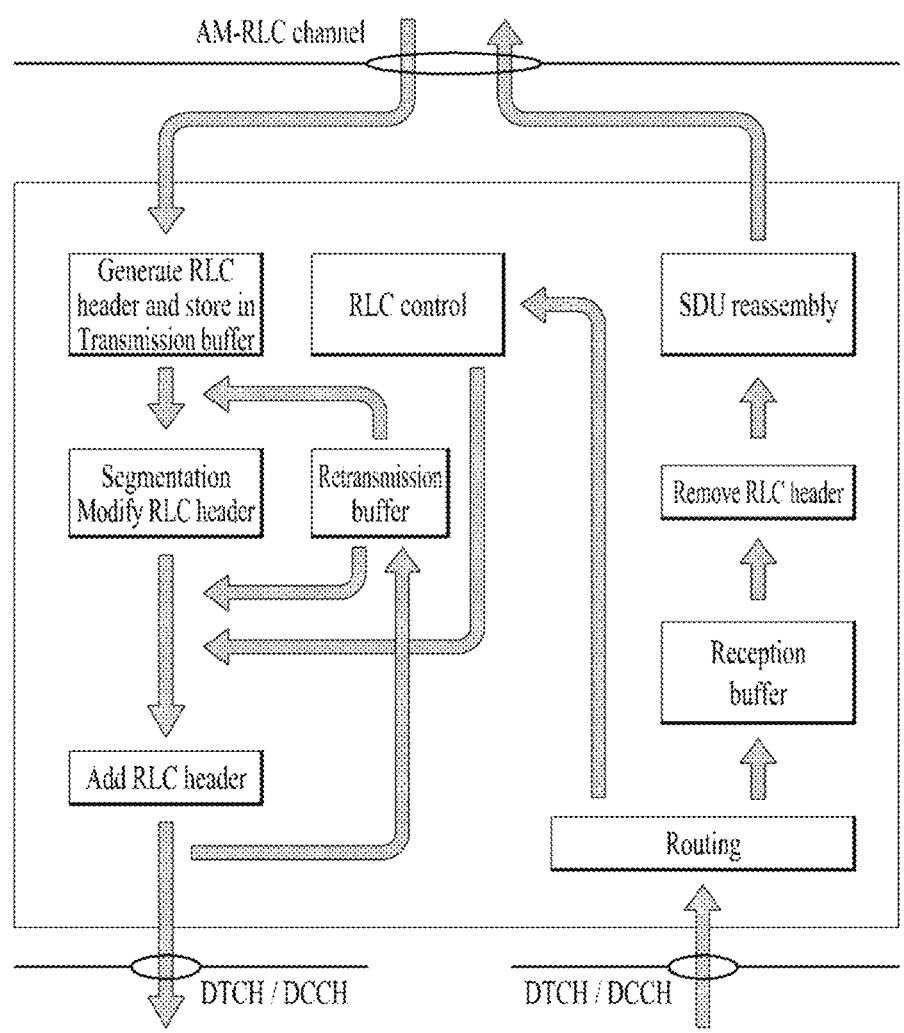
FIG. 9 illustrates a model of an acknowledged mode (AM) radio link control (RLC) entity which can be used in the implementation(s) of the present disclosure.

FIG. 9 illustrates a model of an acknowledged mode (AM) radio link control (RLC) entity which can be used in the implementation(s) of the present disclosure.

The AM RLC entity can be configured to deliver/receive RLC PDUs through the following logical channels: DL/UL DCCH or DL/UL DTCH. An AM RLC entity delivers/receives the following RLC data PDUs: AMD PDU. An AMD PDU contains either one complete RLC SDU or one RLC SDU segment. An AM RLC entity delivers/receives a STATUS PDU which is an RLC control PDU.

In the implementation(s) of the present disclosure, the transmitting side of an AM RLC entity generates AMD PDU(s) for each RLC SDU. When notified of a transmission opportunity by the lower layer, the transmitting AM RLC entity segments the RLC SDUs, if needed, so that the corresponding AMD PDUs, with RLC headers updated as needed, fit within the total size of RLC PDU(s) indicated by lower layer.

The transmitting side of an AM RLC entity supports retransmission of RLC SDUs or RLC SDU segments (ARQ):
  if the RLC SDU or RLC SDU segment to be retransmitted (including the RLC header) does not fit within the total size of RLC PDU(s) indicated by lower layer at the particular transmission opportunity notified by lower layer, the AM RLC entity can segment the RLC SDU or re-segment the RLC SDU segments into RLC SDU segments,
  the number of re-segmentation is not limited.

When the transmitting side of an AM RLC entity forms AMD PDUs from RLC SDUs or RLC SDU segments, it includes relevant RLC headers in the AMD PDU.

In the implementation(s) of the present disclosure, an AMD PDU consists of a Data field and an AMD PDU header. An AM RLC entity may configured by RRC to use either a 12 bit sequence number (SN) or a 18 bit SN. An AMD PDU header contains a poll (P) field and a SN.

An AMD PDU consists of a Data field and an AMD PDU header. The P field is included in the AMD PDU header, and indicates whether or not the transmitting side of an LTE AM RLC entity requests a STATUS report from its peer LTE AM RLC entity. The interpretation of the P field is provided in the following Table 1.

TABLE 1

| Value | Description |
| --- | --- |
| 0 | Status report not requested |
| 1 | Status report is requested |

In the implementation(s) of the present disclosure, data transfer procedures between the transmitting side of an RLC entity and the receiving side of an RLC entity are as follows.

The transmitting side of an AM RLC entity prioritizes transmission of RLC control PDUs over AMD PDUs. The transmitting side of an AM RLC entity prioritizes transmission of AMD PDUs containing previously transmitted RLC SDUs or RLC SDU segments over transmission of AMD PDUs containing not previously transmitted RLC SDUs or RLC SDU segments.

The transmitting side of an AM RLC entity maintains a transmitting window according to the state variable TX_Next_Ack as follows:
  a SN falls within the transmitting window if TX_Next_Ack<=SN<TX_Next_Ack+AM_Window_Size;
  a SN falls outside of the transmitting window otherwise. TX_Next_Ack is the acknowledgement state variable maintained in the transmitting side of each AM RLC entity, and holds the value of the SN of the next RLC SDU for which a positive acknowledgment is to be received in-sequence, and it serves as the lower edge of the transmitting window. It is initially set to 0, and is updated whenever the AM RLC entity receives a positive acknowledgment for an RLC SDU with SN=TX_Next_Ack. AM_Window_Size is a constant used by both the transmitting side and the receiving side of each AM RLC entity. AM_Window_Size=2048 when a 12 bit SN is used, AM_Window_Size=131072 when an 18 bit SN is used.

The transmitting side of an AM RLC entity does not submit to lower layer (i.e. MAC) any AMD PDU whose SN falls outside of the transmitting window. In other words, any AMD PDU whose SN falls outside of the transmitting window is not transmitted in a corresponding transmission opportunity.

For each RLC SDU received from the upper layer (e.g. PDCP), the AM RLC entity associates a SN with the RLC SDU equal to TX_Next and constructs an AMD PDU by setting the SN of the AMD PDU to TX_Next, and increments TX_Next by one. TX_Next is a state variable maintained in the transmitting side of each AM RLC entity and holds the value of the SN to be assigned for the next newly generated AMD PDU. TX_Next is initially set to 0, and is updated whenever the AM RLC entity constructs an AMD PDU with SN=TX_Next which contains an RLC SDU or the last segment of an RLC SDU.

When submitting an AMD PDU that contains a segment of an RLC SDU, to lower layer, the transmitting side of an AM RLC entity sets the SN of the AMD PDU to the SN of the corresponding RLC SDU.

The transmitting side of an AM RLC entity can receive a positive acknowledgement (confirmation of successful reception by its peer AM RLC entity) for an RLC SDU by a STATUS PDU from its peer AM RLC entity.

When receiving a positive acknowledgement for an RLC SDU with SN=x, the transmitting side of an AM RLC entity sends an indication to the upper layers of successful delivery of the RLC SDU, and sets TX_Next_Ack equal to the SN of the RLC SDU with the smallest SN, whose SN falls within the range TX_Next_Ack<=SN<=TX_Next and for which a positive acknowledgments has not been received yet.

Hereinafter, the transmitting side of the AM RLC entity is called a transmitting RLC entity and the receiving side of the AM RLC entity is called a receiving RLC entity.

FIG. 10 shows structures of STATUS PDUs.

STATUS PDU consists of a STATUS PDU payload and an RLC control PDU header. The RLC control PDU header consists of a data/control (D/C) field and a control PDU type (CPT) field.

The STATUS PDU payload starts from the first bit following the RLC control PDU header, and it consists of one acknowledgement SN (ACK_SN) and one extension bit 1 (E1), zero or more sets of a negative acknowledgement SN (NACK_SN), an E1, an extension bit 2 (E2) and an extension bit 3 (E3), and possibly a pair of a segmentation offset start (SOstart) and a SOend or a NACK range field for each NACK_SN.

CPT field indicates the type of the RLC control PDU. The interpretation of the CPT field is provided in Table 2.

TABLE 2

| Value | Description |
| --- | --- |
| 000 | STATUS PDU |
| 001- | Reserved (PDUs with this coding will be discarded by the receiving entity for this release of the protocol) |

The ACK_SN field indicates the SN of the next not received RLC SDU which is not reported as missing in the STATUS PDU. The NACK_SN field indicates the SN of the RLC SDU (or RLC SDU segment) that has been detected as lost at the receiving side of the AM RLC entity.

The E1 field indicates whether or not a set of NACK_SN, E1, E2 and E3 follows. The E2 field indicates whether or not a set of SOstart and SOend follows. The E3 field indicates whether or not information about a continuous sequence of RLC SDUs that have not been received follows.

The SOstart field (together with the SOend field) indicates the portion of the RLC SDU with SN=NACK_SN (the NACK_SN for which the SOstart is related to) that has been detected as lost at the receiving side of the AM RLC entity. When E3 is 0, the SOend field (together with the SOstart field) indicates the portion of the RLC SDU with SN=NACK_SN (the NACK_SN for which the SOend is related to) that has been detected as lost at the receiving side of the AM RLC entity. When E3 is 1, the SOend field indicates the portion of the RLC SDU with SN=NACK_SN+NACK range−1 that has been detected as lost at the receiving side of the AM RLC entity.

This NACK range field is the number of consecutively lost RLC SDUs starting from and including NACK_SN.

In the implementation(s) of the present disclosure, following state variables are used in the RLC entity. All state variables and all counters are non-negative integers. All state variables related to AM data transfer can take values from 0 to 4095 for 12 bit SN or from 0 to 262143 for 18 bit SN. All arithmetic operations contained in the present document on state variables related to AM data transfer are affected by the AM modulus (i.e. final value=[value from arithmetic operation] modulo 4096 for 12 bit SN and 262144 for 18 bit SN).

The transmitting RLC entity maintains the following state variables:

a) TX_Next_Ack—Acknowledgement state variable

The TX_Next_Ack holds the value of the SN of the next RLC SDU for which a positive acknowledgment is to be received in-sequence, and the TX_Next_Ack serves as the lower edge of the transmitting window. The TX_Next_Ack is initially set to 0, and is updated whenever the RLC entity receives a positive acknowledgment for an RLC SDU with SN=TX_Next_Ack.

b) TX_Next—Send state variable

The TX_Next holds the value of the SN to be assigned for the next newly generated RLC PDU. The TX_Next is initially set to 0, and is updated whenever the RLC entity constructs an RLC PDU with SN=TX_Next and contains an RLC SDU or the last segment of a RLC SDU.

c) POLL_SN—Poll send state variable

The POLL_SN holds the value of the highest SN of the RLC PDU among the RLC PDUs submitted to lower layer when POLL_SN is set. The POLL_SN is initially set to 0.

The receiving RLC entity maintains the following state variables:

a) RX_Next—Receive state variable

The RX_Next holds the value of the SN following the last in-sequence completely received RLC SDU, and the RX_Next serves as the lower edge of the receiving window. The RX_Next is initially set to 0, and is updated whenever the RLC entity receives an RLC SDU with SN=RX_Next.

b) RX_Next_Status_Trigger—t-Reassembly state variable

The RX_Next_Status_Trigger holds the value of the SN following the SN of the RLC SDU which triggered t-Reassembly.

c) RX_Highest_Status—Maximum STATUS transmit state variable

The RX_Highest_Status holds the highest possible value of the SN which can be indicated by "ACK_SN" when a STATUS PDU needs to be constructed. The RX_Highest_Status is initially set to 0.

d) RX_Next_Highest—Highest received state variable

The RX_Next_Highest holds the value of the SN following the SN of the RLC SDU with the highest SN among received RLC SDUs. The RX_Next_Highest is initially set to 0.

While, IAB (Integrated access and backhaul) based radio access network (RAN) architecture consists of one or more IAB nodes, which support wireless access to UEs and wirelessly backhauls the access traffic, and one or more IAB donors which provide UE's interface to core network and wireless backhauling functionality to IAB nodes.

FIG. 11 shows integrated access and backhaul (IAB) based RAN architectures.

Referring to FIG. 11, an IAB node has a protocol stack including PHY, MAC, RLC and adaptation layers.

For the RLC ARQ in IAB architecture, two options are under discussion, i.e. hop-by-hop RLC ARQ and end-to-end RLC ARQ. Pros and cons of each option are analyzed in various aspect, e.g. overall latency, resource usage, RLC timer configuration, processing burden, signaling overhead, etc.

The Table 3 indicates observations for end-to-end and hop-by-hop ARQ.

TABLE 3

| Metric | Hop-by-hop RLC ARQ | End-to-end RLC ARQ |
|---|---|---|
| Forwarding latency | Potentially higher as packets have to pass through RLC-state machine on each hop. | Potentially lower as packets do not go through the RLC state machine on intermediate IAB-nodes. |
| Latency due to retransmission | Independent of number of hops | Increases with number of hops |
| Capacity | Packet loss requires retransmission only on one link Avoids redundant retransmission of packets over links where the packet has already been successfully transmitted. | Packet loss may imply retransmission on multiple links, including those where the packet was already successfully transmitted. |
| Hop count limitation due to RLC parameters | Hop count is not affected by max window size. | Hop count may be limited by the end-to-end RLC latency due to max window size. |
| Hop count limitation due to PCDP parameters | Hop count may be limited by increasing disorder of PDCP PDUs over sequential RLC ARQ hops. This may increase probability to exceed max PDCP window size. | Hop count does not impact disorder of PDCP PDUs due to RLC ARQ. |
| Processing and memory impact on intermediate IAB-nodes | Larger since processing and memory is required on intermediate IAB-nodes. | Smaller since intermediate path-nodes do not need ARQ state machine and flow window. |
| RLC specification impact | No stage-3 impact expected | Potential stage-3 impact |
| Operational impact for IAB-node to IAB-donor upgrades | IAB-nodes and IAB-donors use the same hop-by-hop RLC ARQ. As a result, this functionality is completely unaffected by the upgrade of IAB-node to IAB-donor at availability of fiber, potentially reducing the effort required to confirm proper operation. | End-to-end RLC ARQ results in a greater architectural difference between IAB nodes vs. IAB donor nodes. As a result, additional effort may be required to complete an upgrade of an IAB node to an IAB donor upon availability of fiber. |

TABLE 3-continued

| Metric | Hop-by-hop RLC ARQ | End-to-end RLC ARQ |
| --- | --- | --- |
| Configuration complexity | RLC timers are not dependent on hop-count. | RLC timers become hop-count dependent. |
| Lossless delivery of UL data during topology change (e.g. failure of radio link between IAB nodes) | Current specification cannot ensure data lossless delivery when IAB topology changes are performed without additional enhancements (examples listed below). | Lossless delivery ensured due to end to end RLC feedback. |

Considering the Table 3, the IAB based RAN system can support lossless delivery of UL data by the following mechanisms:

Modification of PDCP protocol/procedures;
Rerouting of PDCP PDUs buffered on intermediate IAB-nodes in response to a route update;
Introducing UL status delivery (from IAB donor to IAB node).

Figure 12:
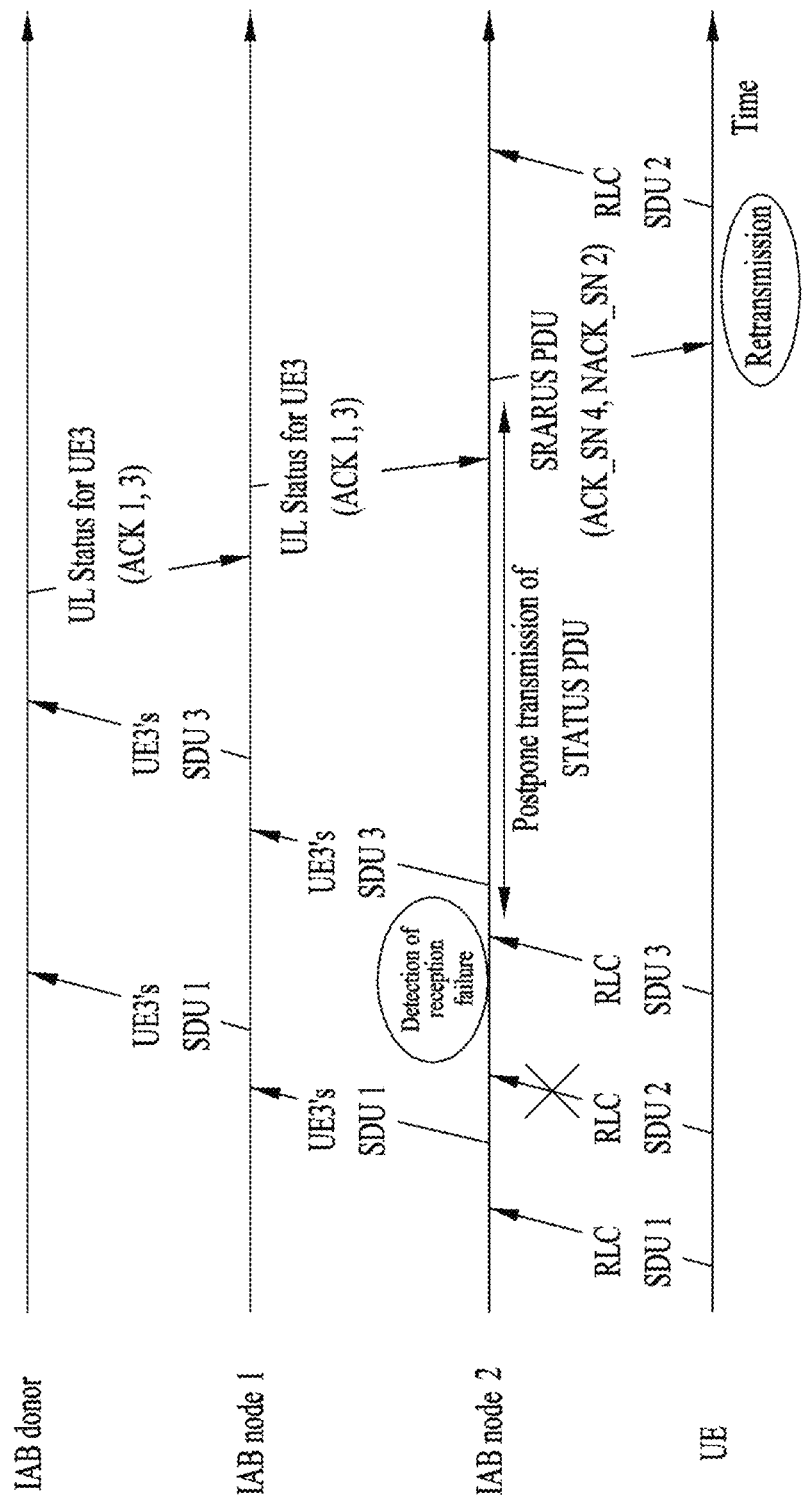
FIG. 12 shows the UL status delivery in IAB based RAN architectures.

FIG. 12 shows the UL status delivery in IAB based RAN architectures.

For the UL status delivery from an IAB donor to an IAB node, a UE's access IAB node does not send a positive acknowledgement (ACK) for a successfully received RLC SDU until successful delivery of the RLC SDU has been confirmed by an IAB donor. It can be too late that the UE knows which RLC SDU(s) has been transmitted successfully. Even, when detecting reception failure of other RLC SDU(s), the UE's access IAB node may not be able to send a negative ACK for the RLC SDU(s).

A receiving RLC entity sends STATUS PDU to provide positive and/or negative ACK of the RLC SDU(s). The STATUS PDU always includes the ACK_SN field which indicates the sequence number (SN) of the next not received RLC SDU which is not reported as missing in the STATUS PDU. So, the UE's access IAB node should wait for a positive ACK to be received from the IAB donor. The UE does not try to retransmit RLC SDU #2 until receiving the STATUS PDU including a negative ACK for the RLC SDU #2. Such delay in receiving a negative ACK can cause increase in data transmission delay.

Therefore, new method for fast data retransmission is needed in the IAB based RAN architecture.

Therefore, in the present invention, it is suggested that the receiving RLC entity transmits a STATUS PDU including negative ACK corresponding to RLC SDU(s) of which the reception failure is detected. Additionally, the STATUS PDU does not include positive ACK information for RLC SDU(s) which are successfully received.

The receiving RLC entity successfully receives all or portions of RLC SDUs from the transmitting RLC entity, when the transmitting RLC entity sends the RLC SDUs to the receiving RLC entity.

The receiving RLC entity triggers STATUS reporting by either polling from the transmitting RLC entity or detection of reception failure of an RLC SDU. When the STATUS reporting has been triggered and a single STATUS PDU for the STATUS reporting is generated, the receiving RLC entity determines whether to include positive ACK in the STATUS PDU.

For example, for RLC SDUs with SN<RX_Highest_Status that has been completely received, if successful delivery of all the RLC SDUs has been confirmed by an IAB donor, the receiving RLC entity includes positive ACK in the STATUS PDU. For RLC SDUs with SN<RX_Highest_Status that has been completely received, if the successful delivery of all the RLC SDUs has not been confirmed by an IAB donor, the receiving RLC entity does not include any positive ACK in the STATUS PDU.

If the receiving RLC entity decides not to include any positive ACK in the STATUS PDU, the receiving RLC entity constructs the STATUS PDU as one of the following formats:

Format #1-1: the STATUS PDU consists of one or more NACK_SN fields, zero or more SOstart fields, SOend fields and NACK range fields and ACK_SN set to special value (e.g., all '0' or all '1');

Format #1-2: the STATUS PDU consists of one or more NACK_SN fields, zero or more SOstart fields, SOend fields and NACK range fields and ACK_SN set to value which is either less than or the same as the smallest/biggest value of the NACK_SN field(s);

Format #2: the STATUS PDU consists of one or more NACK_SN fields and zero or more SOstart fields, SOend fields and NACK range fields. This new format of the STATUS PDU can be indicated by CPT.

In Format #2, the STATUS PDU can have a structure as described in FIG. 13. The new structure of the STATUS PDU is called a NACK STATUS PDU. Specifically, there is no ACK_SN field in the NACK STATUS PDU. In the NACK STATUS PDU, the value of the CPT field is 001 indicating the NACK STATUS PDU, as described in Table 4.

TABLE 4

| CPT Value | Description |
| --- | --- |
| 000 | STATUS PDU |
| 001 | NACK STATUS PDU |
| 010- | Reserved (PDUs with this coding will be discarded by the receiving entity for this release of the protocol) |

The receiving RLC entity transmits the generated STATUS PDU to the transmitting RLC entity.

When receiving the STATUS PDU from the receiving RLC entity, the transmitting RLC entity determines whether the STATUS PDU includes positive ACK or not.

In the following cases, the transmitting RLC entity considers that the STATUS PDU does NOT include positive ACK:

When value of the ACK_SN is a special value (e.g., all '0' or all '1'), if ACK_SN field exists in the received STATUS PDU (When the STATUS PDU has the Format #1-1);

When value of the ACK_SN is either less than or the same as the smallest/biggest value of the NACK_SN(s) of the received STATUS PDU, if ACK_SN field exists in the STATUS PDU (When the STATUS PDU has the Format #1-2);

When CPT field of the received STATUS PDU indicates a NACK STATUS PDU, e.g., CPT field is set to '001' (When the STATUS PDU has the Format #2).

For all STATUS PDU except for these above cases, the transmitting RLC entity can consider that the received STATUS PDU includes positive ACK.

In addition, the above fields also can be used as a field instructing that the acknowledgement state variable (TX_NEXT_ACK) of the transmitting entity is not to be updated.

If the transmitting RLC entity considers that the received STATUS PDU does not include any positive ACK, the transmitting RLC entity can perform at least one of operations below:

ignore ACK_SN in the STATUS PDU;

maintain current TX_NEXT_ACK without any modification;

perform retransmission of RLC SDU(s) for which a negative ACK has been received.

Where, ignoring ACK_SN in the STATUS PDU means that the ACK_SN may not be used for indicating the SN of the next not received RLC SDU which is not reported as missing in the STATUS PDU. Even if the ACK_SN is ignored, the ACK_SN can be used by the transmitting entity for determining whether the STATUS PDU includes positive ACK or for instructing that the TX_NEXT_ACK of the transmitting entity is not to be updated.

Where, the TX_NEXT_ACK is maintained (or not updated) even if a smallest NACK_SN, among NACK_SNs in the STATUS PDU not including any positive ACK, is different from the TX_NEXT_ACK.

If the transmitting RLC entity considers that the received STATUS PDU includes positive ACK, the transmitting RLC entity shall:

interpret that all RLC SDUs up to but not including the RLC SDU with SN=ACK_SN have successfully been received by the receiving RLC entity, excluding those RLC SDUs indicated in the STATUS PDU with NACK_SN, portions of RLC SDUs indicated in the STATUS PDU with NACK_SN, SOstart and SOend, RLC SDUs indicated in the STATUS PDU with NACK_SN and NACK_range, and portions of RLC SDUs indicated in the STATUS PDU with NACK_SN, NACK range, SOstart and SOend;

send an indication to the upper layers of successful delivery of the RLC SDU(s);

set TX_Next_Ack equal to the SN of the RLC SDU with the smallest SN, whose SN falls within the range TX_Next_Ack<=SN<=TX_Next and for which a positive ACK has not been received yet;

retransmit RLC SDU(s) for which a negative ACK has been received.

Figure 14:
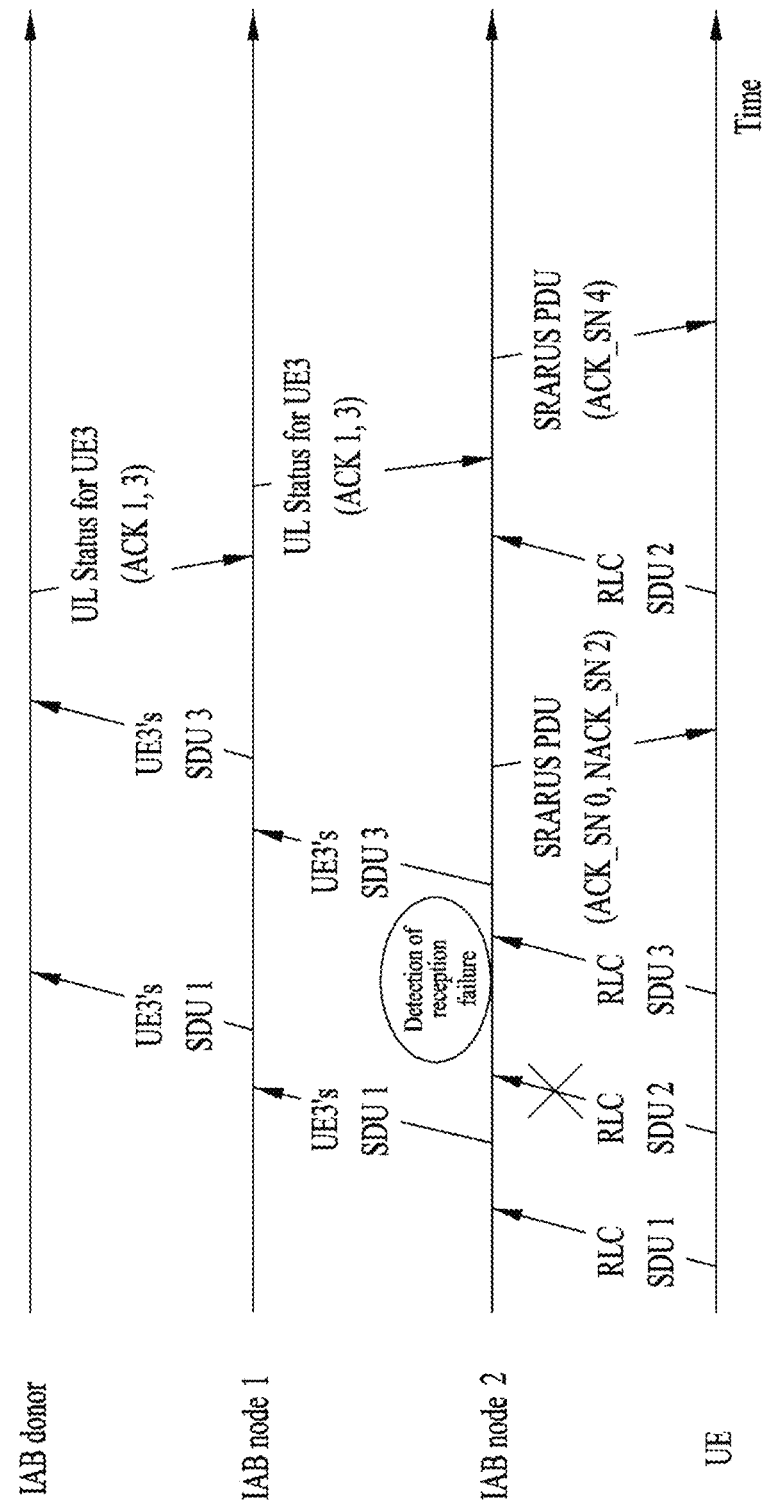
FIG. 14 shows an example of the present invention.

FIG. 14 shows an example of the present invention. Referring to FIG. 14, the UE handles the STATUS PDU that has not been including any positive ACK. When receiving the first STATUS PDU including ACK_SN set to '0' and NACK_SN set to '2', the UE considers that positive ACK has not been included in the first STATUS PDU, and then just retransmits RLC SDU #2 without updating the state variable TX_Next_Ack. After that, the UE receives the second STATUS PDU including ACK_SN set to '4'. The UE considers that positive ACK has been included in the second STATUS PDU. And then the UE indicates to the upper layers successful delivery of the RLC SDU #1, #2 and #3. Also, the UE sets TX_Next_Ack to '4'.

In the example of FIG. 14, all bits of the ACK_SN included in the first STATUS PDU can be set to 1, not 0. Or, the ACK_SN can be less than or same as the smallest value of the NACK_SN(s) of the first STATUS PDU. Or, the ACK_SN can be less than or same as the biggest value of the NACK_SN(s) of the first STATUS PDU. Or, the first STATUS PDU can be the NACK STATUS PDU has a CPT field set to '001' without ACK_SN.

Figure 15:
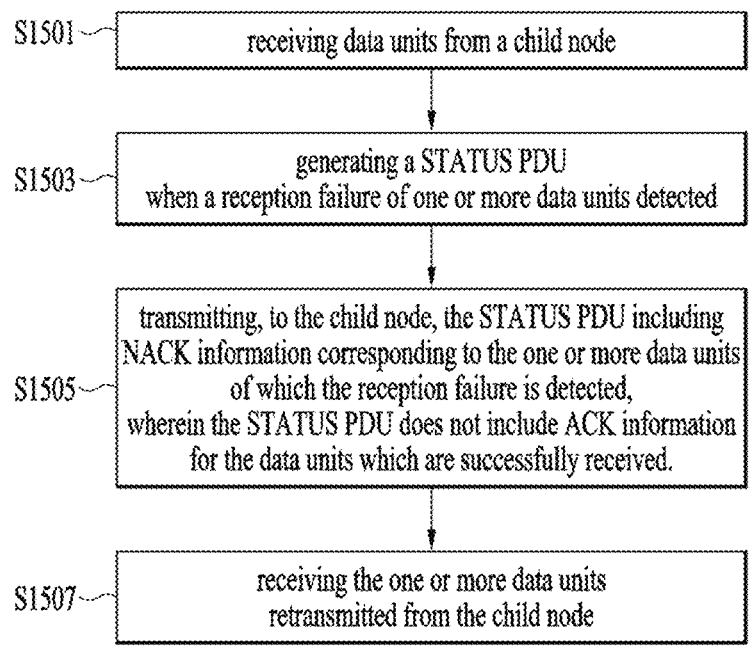
FIG. 15 shows a flow chart for processing signals by a relay node according to the present invention.

FIG. 15 shows a flow chart for transmitting and receiving data by the IAB node according to the present invention.

Referring to FIG. 15, in S1501, receiving, from a child node, data units. There can be one or more parent nodes for the IAB node and the parent node is one of the other IAB nodes or an IAB donor. The child node is a UE (User Equipment) or one of the other IAB nodes excluding the parent node(s).

Then, in S1503, when the IAB node detects a reception failure of one or more data units, the IAB node generates a STATUS PDU. The STATUS PDU can have the Format #1-1, #1-2, or #2.

And then, in S1505, the IAB node transmits, to the child node, the STATUS PDU including NACK information corresponding to the one or more data units of which the reception failure is detected. The STATUS PDU does not include ACK information for the data units which are successfully received.

Additionally, in S1507, the IAB node receives the one or more data units retransmitted from the child node.

One or more of the operations proposed in the embodiments of the present invention described in FIG. 1-14 may be additionally performed in combination to the operations described in FIG. 15.

Figure 16:
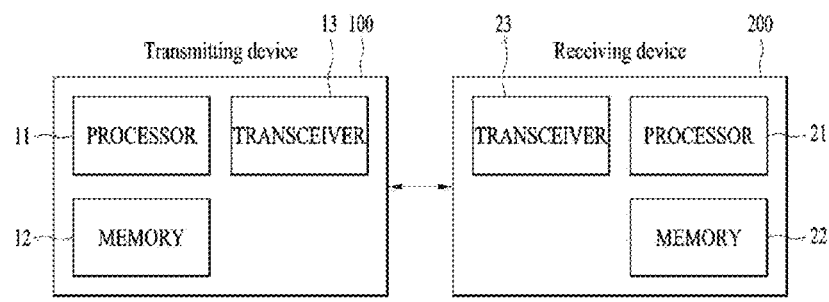
FIG. 16 is a block diagram illustrating an example of elements of a transmitting device 100 and a receiving device 200 according to some implementations of the present disclosure.

FIG. 16 is a block diagram illustrating an example of elements of a transmitting device 100 and a receiving device 200 according to some implementations of the present disclosure.

The transmitting device 100 and the receiving device 200 respectively include transceivers 13 and 23 capable of transmitting and receiving radio signals carrying information, data, signals, and/or messages, memories 12 and 22 for storing information related to communication in a wireless communication system, and processors 11 and 21 operationally connected to elements such as the transceivers 13 and 23 and the memories 12 and 22 to control the elements and configured to control the memories 12 and 22 and/or the transceivers 13 and 23 so that a corresponding device may perform at least one of the above-described implementations of the present disclosure.

The memories 12 and 22 may store programs for processing and controlling the processors 11 and 21 and may temporarily store input/output information. The memories 12 and 22 may be used as buffers. The buffers at each protocol layer (e.g. Adaptation, PDCP, RLC, MAC) are parts of the memories 12 and 22.

The processors 11 and 21 generally control the overall operation of various modules in the transmitting device and the receiving device. Especially, the processors 11 and 21 may perform various control functions to implement the present disclosure. For example, the operations occurring at the protocol stacks (e.g. Adaptation, PDCP, RLC, MAC and PHY layers) according to the present disclosure may be performed by the processors 11 and 21. The protocol stacks performing operations of the present disclosure may be parts of the processors 11 and 21.

The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. The present disclosure may be implemented using firmware or software, and the firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the transceiver 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transceiver 13 may include an oscillator. The transceiver 13 may include Nt (where Nt is a positive integer) transmission antennas.

A signal processing process of the receiving device 200 is the reverse of the signal processing process of the transmitting device 100. Under control of the processor 21, the transceiver 23 of the receiving device 200 receives radio signals transmitted by the transmitting device 100. The transceiver 23 may include Nr (where Nr is a positive integer) receive antennas and frequency down-converts each signal received through receive antennas into a baseband signal. The processor 21 decodes and demodulates the radio signals received through the reception antennas and restores data that the transmitting device 100 intended to transmit.

The transceivers 13 and 23 include one or more antennas. An antenna performs a function for transmitting signals processed by the transceivers 13 and 23 to the exterior or receiving radio signals from the exterior to transfer the radio signals to the transceivers 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. A transceiver supporting a MIMO function of transmitting and receiving data using a plurality of antennas may be connected to two or more antennas. The transceivers 13 and 23 may be referred to as radio frequency (RF) units.

In the implementations of the present disclosure, a UE and/or IAB node operates as the transmitting device 100 in UL and as the receiving device 200 in DL. In the implementations of the present disclosure, a BS, IAB donor and/or IAB node operates as the receiving device 200 in UL and as the transmitting device 100 in DL. Hereinafter, a processor, a transceiver, and a memory included in the UE will be referred to as a UE processor, a UE transceiver, and a UE memory, respectively, and a processor, a transceiver, and a memory included in the BS will be referred to as a BS processor, a BS transceiver, and a BS memory, respectively. A processor, a transceiver, and a memory included in the IAB node will be referred to as a IAB node processor, a IAB node transceiver, and a IAB node memory, respectively. A processor, a transceiver, and a memory included in the IAB donor will be referred to as a IAB donor processor, a IAB donor transceiver, and a IAB donor memory, respectively.

The UE processor can be configured to operate according to the present disclosure, or control the UE transceiver to receive or transmit signals according to the present disclosure. The BS processor can be configured to operate according to the present disclosure, or control the BS transceiver to receive or transmit signals according to the present disclosure.

The processor 11 (at a UE, IAB node, IAB donor and/or BS) checks whether there is a UL grant or DL assignment for a serving cell in a time unit. If there is a UL grant or DL assignment for the serving cell in the time unit, the processor 11 checks whether a data unit is actually present on the UL grant or DL assignment in the time unit, in order to determine whether to restart a deactivation timer associated with the serving cell which has been started. The processor 11 restarts the deactivation timer associated with the serving cell in the time unit if there is a data unit present on the UL grant or DL assignment in the time unit. The processor 11 does not restart the deactivation timer associated with the serving cell in the time unit if there is no data unit present on the UL grant or DL assignment in the time unit, unless another condition that the processor 11 should restart the deactivation timer is satisfied. The processor 11 does not restart the deactivation timer associated with the serving cell in the time unit if there is no data unit present on the UL grant or DL assignment in the time unit and if an activation command for activating the serving cell is not present in the time unit. The processor 11 may be configured to check whether a data unit is actually present on the UL grant or DL assignment on the serving cell in the time unit in order to determine whether to restart the deactivation timer of the serving cell, if the UL grant or DL assignment is a configured grant/assignment which is configured by RRC to occur periodically on the serving cell. The processor 11 may be configured to check whether a data unit is actually present on the UL grant or DL assignment on the serving cell in the time unit in order to determine whether to restart the deactivation timer of the serving cell, if the UL grant or the DL assignment is a dynamic grant/assignment which is indicated by a PDCCH. The processor 11 may be configured to check whether a data unit is actually present on the UL grant or DL assignment on the serving cell in the time unit in order to determine whether to restart the deactivation timer of the serving cell, if the serving cell is a SCell of the UE. The processor 11 (at the UE and/or the BS) deactivates the serving cell upon expiry of the deactivation timer associated with the serving cell.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

While the above-described method has been described centering on an example applied to the 3GPP LTE and NR system, the present invention is applicable to a variety of wireless communication systems in addition to the 3GPP LTE and NR system.

What is claimed is:

1. A method for transmitting and receiving data by an Integrated Access and Backhaul (IAB) node in a wireless communication system, the method comprising:
  receiving, from a child node, data units;
  generating a STATUS Protocol Data Unit (PDU) when a reception failure of one or more data units is detected;
  transmitting, to the child node, the STATUS PDU including Negative Acknowledgement (NACK) information corresponding to the one or more data units of which the reception failure is detected, wherein the STATUS PDU does not include ACK information for the data units which are successfully received,
  wherein an acknowledgement state variable of the child node is not updated based on the STATUS PDU including a field instructing that the acknowledgement state variable of the child node is not to be updated, or the acknowledgement state variable of the child node is not updated based on a smallest Sequence Number (SN) among SNs related to the NACK information being different from the acknowledgement state variable.

2. The method of claim 1, further comprising:
  receiving the one or more data units retransmitted from the child node.

3. The method of claim 1, wherein:
  the STATUS PDU includes a Control PDU Type (CPT) field set to a specific value indicating that the STATUS PDU does not include the ACK information for the data units which are successfully received, or
  the STATUS PDU includes an ACK SN field set to a specific value indicating that the STATUS PDU does not include the ACK information for the data units which are successfully received, or
  the STATUS PDU includes the ACK SN field set to a value which is equal to or less than a smallest SN among SNs of the NACK information of which the reception failure is detected, or
  the STATUS PDU includes the ACK SN field set to a value which is equal to or less than a biggest SN among the SNs of the NACK information of which the reception failure is detected.

4. An Integrated Access and Backhaul (IAB) node for transmitting and receiving data in a wireless communication system, the IAB node comprising:
  a memory; and
  at least one processor coupled to the memory and configured to:
  receive, from a child node, data units;
  generate a STATUS Protocol Data Unit (PDU) when a reception failure of one or more data units is detected;
  transmit, to the child node, the STATUS PDU including Negative Acknowledgement (NACK) information corresponding to the one or more data units of which the reception failure is detected, wherein the STATUS PDU does not include ACK information for the data units which are successfully received,
  wherein an acknowledgement state variable of the child node is not updated based on the STATUS PDU including a field instructing that the acknowledgement state variable of the child node is not to be updated, or the acknowledgement state variable of the child node is not updated based on a smallest Sequence Number (SN) among SNs related to the NACK information being different from the acknowledgement state variable.

5. The IAB node of claim 4, wherein the at least one processor is further configured to:
  receive the one or more data units retransmitted from the child node.

6. The IAB node of claim 4, wherein:
  the STATUS PDU includes a Control PDU Type (CPT) field set to a specific value indicating that the STATUS PDU does not include the ACK information for the data units which are successfully received, or
  the STATUS PDU includes an ACK SN field set to a specific value indicating that the STATUS PDU does not include the ACK information for the data units which are successfully received, or
  the STATUS PDU includes the ACK SN field set to a value which is equal to or less than a smallest SN among SNs of the NACK information of which the reception failure is detected, or the STATUS PDU includes the ACK SN field set to a value which is equal to or less than a biggest SN among the SNs of the NACK information of which the reception failure is detected.

7. The IAB node of claim 4, wherein the at least one processor is further configured to implement at least one advanced driver assistance system (ADAS) function based on signals that control a User Equipment (UE).

8. The IAB node of claim 4, wherein the IAB communicates with at least one of user equipment (UE), a UE related to an autonomous driving vehicle, a base station and/or a network.

* * * * *